(12) United States Patent
Ha et al.

(10) Patent No.: US 11,702,540 B2
(45) Date of Patent: Jul. 18, 2023

(54) THERMOPLASTIC RESIN COMPOSITION AND MOLDED ARTICLE MANUFACTURED THEREFROM

(71) Applicant: LOTTE CHEMICAL CORPORATION, Seoul (KR)

(72) Inventors: Dong In Ha, Uiwang-si (KR); Seung Shik Shin, Uiwang-si (KR); Tae Gon Kang, Uiwang-si (KR); Seung Kap Lee, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 315 days.

(21) Appl. No.: 16/770,672

(22) PCT Filed: Dec. 28, 2018

(86) PCT No.: PCT/KR2018/016835
§ 371 (c)(1),
(2) Date: Jun. 8, 2020

(87) PCT Pub. No.: WO2019/132572
PCT Pub. Date: Jul. 4, 2019

(65) Prior Publication Data
US 2021/0171766 A1  Jun. 10, 2021

(30) Foreign Application Priority Data
Dec. 29, 2017 (KR) .......... 10-2017-0184895
Dec. 18, 2018 (KR) .......... 10-2018-0164256

(51) Int. Cl.
| | | |
|---|---|---|
| *C08L 69/00* | (2006.01) | |
| *C08F 222/06* | (2006.01) | |
| *C08F 236/06* | (2006.01) | |
| *C08K 3/04* | (2006.01) | |
| *C08K 3/34* | (2006.01) | |
| *C08K 5/00* | (2006.01) | |
| *C08K 5/521* | (2006.01) | |
| *C08L 23/16* | (2006.01) | |
| *C08L 23/26* | (2006.01) | |
| *C08L 25/08* | (2006.01) | |
| *C08L 51/04* | (2006.01) | |
| *C08L 51/06* | (2006.01) | |
| *C08L 55/02* | (2006.01) | |

(52) U.S. Cl.
CPC ........... *C08L 69/00* (2013.01); *C08F 222/06* (2013.01); *C08F 236/06* (2013.01); *C08K 3/04* (2013.01); *C08K 3/34* (2013.01); *C08K 5/0066* (2013.01); *C08K 5/521* (2013.01); *C08L 23/16* (2013.01); *C08L 23/26* (2013.01); *C08L 25/08* (2013.01); *C08L 51/04* (2013.01); *C08L 51/06* (2013.01); *C08L 55/02* (2013.01); *C08K 2201/003* (2013.01); *C08L 2201/02* (2013.01); *C08L 2203/20* (2013.01); *C08L 2203/30* (2013.01); *C08L 2205/025* (2013.01); *C08L 2205/035* (2013.01); *C08L 2205/18* (2013.01); *C08L 2205/22* (2013.01)

(58) Field of Classification Search
CPC ...................................... C08L 55/02
See application file for complete search history.

(56) References Cited

U.S. PATENT DOCUMENTS

| | | | | |
|---|---|---|---|---|
| 4,868,235 | A * | 9/1989 | Muehlbach | C08L 51/04 524/252 |
| 9,340,671 | B2 * | 5/2016 | Ha | C08L 69/00 |
| 9,771,476 | B2 * | 9/2017 | Kim | C08L 69/00 |
| 2004/0178383 | A1 | 9/2004 | Kikuchi | |
| 2008/0015290 | A1 | 1/2008 | Siripurapu et al. | |
| 2009/0054568 | A1 | 2/2009 | Uejima et al. | |
| 2013/0196130 | A1 | 8/2013 | Hufen et al. | |
| 2015/0183986 | A1 | 7/2015 | Kim et al. | |
| 2015/0368459 | A1 | 12/2015 | Yamanaka et al. | |
| 2017/0190908 | A1 | 7/2017 | Choi et al. | |
| 2018/0118935 | A1 * | 5/2018 | Ha | H05K 5/0217 |

FOREIGN PATENT DOCUMENTS

| | | |
|---|---|---|
| EP | 3187542 A1 | 7/2017 |
| JP | 2004-323565 A | 11/2004 |
| JP | 2015-028135 A | 2/2015 |
| KR | 10-2008-0000570 A | 1/2008 |
| KR | 10-2009-0028766 A | 3/2009 |
| KR | 10-2015-0078277 A | 7/2015 |
| KR | 10-2017-0080167 A | 7/2017 |
| WO | 2019/132572 A1 | 7/2019 |

OTHER PUBLICATIONS

International Search Report in counterpart International Application No. PCT/KR2018/016835 dated Apr. 5, 2019, pp. 1-6.
Search Report in counterpart European Application No. 18896169.2 dated Sep. 6, 2021, pp. 1-5.

* cited by examiner

*Primary Examiner* — Brieann R Johnston
(74) *Attorney, Agent, or Firm* — Additon, Pendleton & Witherspoon, P.A.

(57) ABSTRACT

A thermoplastic resin composition of the present invention comprises: a polycarbonate resin; a rubber-modified vinyl-based graft copolymer; a large particle size rubbery polymer having an average particle size of about 400 to about 1,500 nm; an aromatic vinyl-based copolymer resin; a phosphorus-based flame retardant; talc; wollastonite; a maleic anhydride grafted rubbery polymer; and a black pigment. The thermoplastic resin composition is superior in terms of adhesion to metal, strength, flame retardancy, fluidity, and appearance.

15 Claims, 1 Drawing Sheet

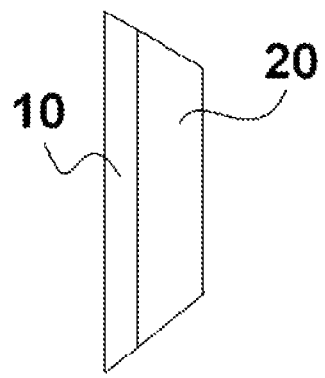

THERMOPLASTIC RESIN COMPOSITION AND MOLDED ARTICLE MANUFACTURED THEREFROM

CROSS-REFERENCE TO RELATED APPLICATIONS

This application claims priority to and the benefit of International Application No. PCT/KR2018/016835, filed Dec. 28, 2018, which published as WO 2019/132572 on Jul. 4, 2019, Korean Patent Application No. 10-2017-0184895, filed in the Korean Intellectual Property Office on Dec. 29, 2017, and Korean Patent Application No. 10-2018-0164256, filed in the Korean Intellectual Property Office on Dec. 18, 2018, the entire disclosure of each of which is incorporated herein by reference.

TECHNICAL FIELD

The present invention relates to a thermoplastic resin composition and a molded article manufactured therefrom. More particularly, the present invention relates to a thermoplastic resin composition having good properties in terms of adhesion to metal, stiffness, flame retardancy, flowability, external appearance, and the like, and a molded article manufactured therefrom.

BACKGROUND ART

Thermoplastic resin compositions are useful for housings of electrical/electronic products, automotive interior/exterior materials, and exterior materials for buildings due to lower specific gravity than glass or metal, good moldability, and good impact resistance. Particularly, with the trend toward larger and lighter electrical/electronic products, plastic products produced from thermoplastic resins are rapidly replacing typical glass and metal-based products in the related art.

Among such thermoplastic resin compositions, a PC/ABS-based thermoplastic resin composition prepared by blending a polycarbonate (PC) resin with a rubber-modified aromatic vinyl copolymer resin, such as an acrylonitrile-butadiene-styrene (ABS) copolymer resin, is used in various fields since the PC/ABS-based thermoplastic resin composition enables cost reduction and improvement in processability, chemical resistance and other properties without deterioration in impact resistance and heat resistance of the polycarbonate resin.

Further, since a thermoplastic resin composition having good adhesion to metal can be applied to various fields including exterior materials for portable devices, there is a need for studies for development of a thermoplastic resin composition having improved adhesion to metal and such a thermoplastic resin composition may include inorganic fillers, such as glass fibers, talc, wollastonite, and the like, and a flame retardant to improve stiffness, flame retardancy, and the like.

However, the thermoplastic resin composition including the inorganic fillers, such as glass fibers and the like, can suffer from deterioration in flowability and elongation, and has a concern of protrusion of the glass fibers, which makes it difficult to realize good appearance.

Therefore, there is a need for development of a thermoplastic resin composition having good properties in terms of adhesion to metal, stiffness, flame retardancy, flowability, external appearance, and the like.

The background technique of the present invention is disclosed in JP Unexamined Patent Publication No. 2015-028135 and the like.

DISCLOSURE

Technical Problem

It is one aspect of the present invention to provide a thermoplastic resin composition having good properties in terms of adhesion to metal, stiffness, flame retardancy, flowability, external appearance, and the like.

It is another aspect of the present invention to provide a molded article formed of the thermoplastic resin composition.

The above and other aspects of the present invention can be achieved by the present invention described below.

Technical Solution

1. One aspect of the present invention relates to a thermoplastic resin composition. The thermoplastic resin composition includes: a polycarbonate resin; a rubber-modified vinyl graft copolymer; a large-diameter rubber polymer having an average particle diameter of about 400 nm to about 1,500 nm; an aromatic vinyl copolymer resin; a phosphorus flame retardant; talc; wollastonite; a maleic anhydride-grafted rubber polymer; and a black pigment.

2. In Embodiment 1, the thermoplastic resin composition may include: about 100 parts by weight of the polycarbonate resin; about 1 part by weight to about 10 parts by weight of the rubber-modified vinyl graft copolymer; about 0.5 parts by weight to about 5 parts by weight of the large-diameter rubber polymer; about 3 parts by weight to about 20 parts by weight of the aromatic vinyl copolymer resin; about 10 parts by weight to about 30 parts by weight of the phosphorus flame retardant; about 3 parts by weight to about 25 parts by weight of the talc; about 5 parts by weight to about 20 parts by weight of the wollastonite; about 0.01 parts by weight to about 5 parts by weight of the maleic anhydride-grafted rubber polymer; and about 0.05 parts by weight to about 3 parts by weight of the black pigment.

3. In Embodiment 1 or 2, the rubber-modified vinyl graft copolymer may be obtained through graft copolymerization of a monomer mixture including an aromatic vinyl monomer and a vinyl cyanide monomer to a rubber polymer having an average particle diameter of about 100 nm to about 600 nm.

4. In Embodiments 1 to 3, the large-diameter rubber polymer and the aromatic vinyl copolymer resin may be present in the form of a rubber-modified aromatic vinyl copolymer resin (a mixture of a large-diameter rubber polymer having a dispersed phase and an average particle diameter of about 400 nm to about 1,500 nm and an aromatic vinyl copolymer resin having a continuous phase) prepared through continuous solution polymerization of a rubber polymer having a viscosity of about 150 cP or more in a 5 wt % styrene solution, an aromatic vinyl monomer, and a monomer copolymerizable with the aromatic vinyl monomer.

5. In Embodiments 1 to 4, the aromatic vinyl copolymer resin may be a polymer of an aromatic vinyl monomer and a monomer copolymerizable with the aromatic vinyl monomer.

6. In Embodiments 1 to 5, the phosphorus flame retardant may include at least one of a phosphate compound, a phosphonate compound, a phosphinate compound, a phosphine oxide compound, and a phosphazene compound.

7. In Embodiments 1 to 6, the talc and the wollastonite may be present in a weight ratio of about 1:0.3 to about 1:2.

8. In Embodiments 1 to 7, the maleic anhydride-grafted rubber polymer may include at least one of maleic anhydride-grafted ethylene-octene rubber (MAH-g-EOR), maleic anhydride-grafted ethylene-butene rubber (MAH-g-EBR), maleic anhydride-grafted ethylene-propylene-diene monomer terpolymer (MAH-g-EPDM), maleic anhydride-grafted styrene-ethylene-butadiene-styrene copolymer (MAH-g-SEBS), maleic anhydride-grafted polypropylene (MAH-g-PP), and maleic anhydride-grafted polyethylene (MAH-g-PE).

9. In Embodiments 1 to 8, the black pigment may have an average particle diameter of about 10 nm to about 24 nm.

10. In Embodiments 1 to 9, the thermoplastic resin composition may have a bonding strength (shear strength) of about 140 $kgf/cm^2$ to 300 about $kgf/cm^2$, as measured in accordance with ASTM D1002 on an injection molded specimen having a size of 100 mm×25 mm×2 mm and bonded to a metal specimen having the same size as the injection molded specimen to overlap each other in an area of 25 mm×25 mm via a bonding agent, after heating a bonded portion between the specimens at 80° C. for 120 seconds and aging at room temperature for 5 minutes.

11 In Embodiments 1 to 10, the thermoplastic resin composition may have a flame retardancy of V-1 or higher, as measured on a 1.0 mm thick specimen by a UL-94 vertical test method.

12. In Embodiments 1 to 11, the thermoplastic resin composition may have a melt-flow index (MI) of about 30 g/10 min to about 60 g/10 min, as measured under conditions of 220° C. and 5 kgf in accordance with ASTM D1238.

13. Another aspect of the present invention relates to a molded article. The molded article is formed of the thermoplastic resin composition according to any one of Embodiments 1 to 12.

14. In Embodiment 13, the molded article may be a plastic member of an electronic device housing including a metal frame and a plastic member adjoining at least one surface of the metal frame.

Advantageous Effects

The present invention provides a thermoplastic resin composition having good properties in terms of adhesion to metal, stiffness, flame retardancy, flowability, external appearance, and the like, and a molded article formed therefrom.

BRIEF DESCRIPTION OF DRAWINGS

FIG. 1 is a schematic sectional view of an electronic device housing according to one embodiment of the present invention.

BEST MODE

Hereinafter, embodiments of the present invention will be described in detail.

A thermoplastic resin composition according to the present invention includes: (A) a polycarbonate resin; (B) a rubber-modified vinyl graft copolymer; (C) a large-diameter rubber polymer; (D) an aromatic vinyl copolymer resin; (E) a phosphorus flame retardant; (F) talc; (G) wollastonite; (H) a maleic anhydride-grafted rubber polymer; and (I) a black pigment.

As used herein to represent a specific numerical range, the expression "a to b" means "≥a and ≤b".

(A) Polycarbonate Resin

The polycarbonate resin according to one embodiment of the invention may include any typical polycarbonate resin used in thermoplastic resin compositions. For example, the polycarbonate resin may be an aromatic polycarbonate resin prepared by reacting diphenols (aromatic diol compounds) with a precursor, such as phosgene, halogen formate, or carbonate diester.

In some embodiments, the diphenols may include, for example, 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis-(3,5-dichloro-4-hydroxyphenyl) propane, without being limited thereto. For example, the diphenols may be 2,2-bis(4-hydroxyphenyl)propane, 2,2-bis (3,5-dichloro-4-hydroxyphenyl)propane or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good flowability (processability).

In some embodiments, the polycarbonate resin may have a melt-flow index (MI) of about 10 g/10 min to about 110 g/10 min, as measured at 300° C. under a load of 1.2 kgf in accordance with ISO 1133. Alternatively, the polycarbonate resin may be a mixture of at least two polycarbonate resins having different melt flow indexes.

(B) Rubber-Modified Vinyl Graft Copolymer

The rubber-modified vinyl graft copolymer according to one embodiment of the invention serves to improve impact resistance and chemical resistance of the thermoplastic resin composition, and may be obtained by graft polymerization of a monomer mixture including an aromatic vinyl monomer and a vinyl cyanide monomer to a rubber polymer. For example, the rubber-modified vinyl graft copolymer may be obtained by graft polymerization of the monomer mixture including the aromatic vinyl monomer and the vinyl cyanide monomer to the rubber polymer, in which the monomer mixture may further include a monomer for imparting processability and heat resistance to the monomer mixture, as needed. Here, polymerization may be performed by any polymerization method known in the art, such as emulsion polymerization, suspension polymerization, and the like. In addition, the rubber-modified vinyl graft copolymer may have a core (rubber polymer)-shell (copolymer of the monomer mixture) structure.

In some embodiments, the rubber polymer may include, for example, diene rubbers, such as polybutadiene, poly(styrene-butadiene), and poly(acrylonitrile-butadiene); saturated rubbers obtained by adding hydrogen to the diene rubbers; isoprene rubbers; acrylate rubbers (rubber polymer), such as poly(butyl acrylate) and the like; and ethylene-propylene-diene monomer terpolymer (EPDM), without being limited thereto. These may be used alone or as a mixture thereof. For example, the rubber polymer may include diene rubbers and acrylic rubbers, specifically polybutadiene rubber and poly(butyl acrylate) rubber.

In some embodiments, the rubber polymer (rubber particle) may have an average particle diameter (z-average) of about 100 nm to about 600 nm, for example, about 300 nm to about 500 nm, as measured using a particle size analyzer. Within this range, the thermoplastic resin composition can have good properties in terms of impact resistance, external appearance, and the like. Here, the average particle diameter (z-average) of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the rubber polymer may be present in an amount of about 20 wt % to about 70 wt %, for example, about 30 wt % to about 65 wt %, based on 100 wt % of the rubber-modified vinyl graft copolymer, and the monomer mixture (including the aromatic vinyl monomer and the vinyl cyanide monomer) may be present in an amount of about 30 wt % to about 80 wt %, for example, about 35 wt % to about 70 wt %, based on 100 wt % of the rubber-modified vinyl graft copolymer. Within this range, the thermoplastic resin composition can have good properties in terms of impact resistance, external appearance, and the like.

In some embodiments, the aromatic vinyl monomer may be graft copolymerizable with the rubber polymer and may include, for example, styrene, α-methyl styrene, β-methyl-styrene, p-methyl styrene, p-t-butylstyrene, ethyl styrene, vinylxylene, monochlorostyrene, dichlorostyrene, dibromostyrene, vinyl naphthalene, and the like. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include acrylonitrile, methacrylonitrile, and the like. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the rubber-modified vinyl graft copolymer may include, for example, an acrylonitrile-butadiene-styrene graft copolymer (g-ABS), an acrylate-styrene-acrylonitrile graft copolymer (g-ASA), and the like.

In some embodiments, the rubber-modified vinyl graft copolymer may be present in an amount of about 1 part by weight to about 10 parts by weight, for example, about 3 parts by weight to about 7 parts by weight, relative to about 100 parts by weight of the polycarbonate resin. Within this range, the thermoplastic resin composition can exhibit good properties in terms of external appearance, impact resistance, flowability (molding processability), and the like.

(C) Large-Diameter Rubber Polymer and (D) Aromatic Vinyl Copolymer Resin

The large-diameter rubber polymer according to one embodiment of the invention may have an average particle diameter (z-average) of about 400 nm to about 1,500 nm, for example, about 500 nm to about 1,000 nm, specifically about 500 nm to about 650 nm. Within this range, the thermoplastic resin composition can have good properties in terms of impact resistance, external appearance, and the like. Here, the average particle diameter (z-average) of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs). If the average particle diameter of the large-diameter rubber polymer is less than about 400 nm, the thermoplastic resin composition can suffer from deterioration in adhesion to metal, external appearance (low gloss), and the like, and if the average particle diameter of the large-diameter rubber polymer exceeds about 1,500 nm, the thermoplastic resin composition can suffer from deterioration in flame retardancy, external appearance, and the like.

In some embodiments, the large-diameter rubber polymer (C) and the aromatic vinyl copolymer resin (D) may be present in the thermoplastic resin composition in the form of a rubber-modified aromatic vinyl copolymer resin (a mixture of the large-diameter rubber polymer (C) having a dispersed phase and an average particle diameter of about 400 nm to about 1,500 nm and the aromatic vinyl copolymer resin (D) having a continuous phase) prepared by continuous solution polymerization of a rubber polymer having a viscosity of about 150 cP or more in a 5 wt % styrene solution, an aromatic vinyl monomer, and a monomer copolymerizable with the vinyl cyanide monomer.

Specifically, the rubber-modified aromatic vinyl copolymer resin may be prepared by mixing a polymerization initiator and a molecular weight regulator with a mixed solution of the rubber polymer, the aromatic vinyl monomer, the monomer copolymerizable with the aromatic vinyl monomer, and a solvent to prepare a reaction solution; introducing the reaction solution into a first reactor, followed by polymerization to a conversion ratio of about 30% to about 40%; and introducing a polymerized product prepared in the first reactor into a second reactor, followed by polymerization to a conversion ratio of about 70% to about 80%.

In some embodiments, the mixed solution may include about 3 wt % to about 15 wt % of the rubber polymer, about 50 wt % to about 85 wt % of the aromatic vinyl monomer and the monomer copolymerizable with the aromatic vinyl monomer, and about 5 wt % to about 30 wt % of the solvent.

In some embodiments, the rubber polymer included in the mixed solution may include, for example, diene rubbers (rubber polymers), such as polybutadiene, poly(styrene-butadiene), and poly(acrylonitrile-butadiene); saturated rubbers obtained by adding hydrogen to the diene rubbers; isoprene rubbers; acrylate rubbers (rubber polymers), such as poly(butyl acrylate); and ethylene-propylene-diene terpolymer (EPDM), without being limited thereto. These may be used alone or as a mixture thereof. For example, the rubber polymer may be diene rubbers, specifically, polybutadiene rubbers. In addition, the rubber polymer may have a viscosity of about 150 cP or more in a 5 wt % styrene solution, for example, about 150 cP to about 300 cP, specifically about 160 cP to about 200 cP. Within this range of viscosity in the styrene solution, the large-diameter rubber polymer can be prepared.

In some embodiments, the aromatic vinyl monomer included in the mixed solution may include styrene, α-methylstyrene, β-methylstyrene, p-methylstyrene, p-t-butyl styrene, ethyl styrene, vinyl xylene, monochlorostyrene, dichlorostyrene, dibromostyrene, and vinyl naphthalene, without being limited thereto. These may be used alone or as a mixture thereof.

In some embodiments, the monomer copolymerizable with the aromatic vinyl monomer included in the mixed solution may include, for example, vinyl cyanide monomers, such as acrylonitrile, methacrylonitrile, ethacrylonitrile, phenyl acrylonitrile, α-chloroacrylonitrile, fumaronitrile, and the like. These may be used alone or as a mixture thereof.

In some embodiments, the aromatic vinyl monomer may be present in an amount of about 20 wt % to about 90 wt %, for example, about 30 wt % to about 80 wt %, based on 100 wt % of the aromatic vinyl monomer and the monomer copolymerizable with the aromatic vinyl monomer, and the monomer copolymerizable with the aromatic vinyl monomer may be present in an amount of about 10 wt % to about 80 wt %, for example, about 20 wt % to about 70 wt %, based on 100 wt % of the aromatic vinyl monomer and the monomer copolymerizable with the aromatic vinyl monomer.

In some embodiments, the solvent may be an aromatic organic solvent. For example, ethyl benzene, xylene, or toluene may be used as the solvent. These may be used alone or as a mixture thereof.

In some embodiments, the polymerization initiator preferably has a half-life of 10 minutes or less at a reactor polymerization temperature and may include, for example, radical initiators, such as 1,1-bis(t-butylperoxy)-2-methylcyclohexane, 1,1-bis(t-butylperoxy)cyclohexane, 2-bis(4,4-di-t-butylperoxy cyclohexane)propane, t-hexylperoxy isopropyl monocarbonate, t-butylperoxy maleic acid, t-butylperoxy-3,5,5-trimethylhexanoate, t-butylperoxy laurate, 2,5-dimethyl-2,5-bis(m-toluoylperoxy)hexane, t-butylperoxy isopropyl monocarbonate, t-butylperoxy 2-ethylhexyl monocarbonate, t-hexylperoxy benzoate, 2,5-dimethyl-2,5-bis(benzoylperoxy)hexane, t-butylperoxy acetate, 2,2-bis(t-butylperoxy)butane, t-butylperoxy benzoate, n-butyl-4,4-bis(t-butylperoxy)valerate, and mixtures thereof. The polymerization initiator may be present in an amount of about 0.007 parts by weight to about 0.07 parts by weight, for example, about 0.01 parts by weight to about 0.05 parts by weight, relative to about 100 parts by weight of the mixed solution. Within this range, deterioration in appearance characteristics due to remaining polymerization initiator can be reduced.

In some embodiments, the molecular weight regulator may include alkyl mercaptans, such as t-dodecyl mercaptan, n-dodecyl mercaptan, and the like. The molecular weight regulator may be present in an amount of about 0.02 parts by weight to about 1 part by weight, for example, about 0.03 parts by weight to about 0.5 parts by weight, relative to about 100 parts by weight of the mixed solution.

In some embodiments, the continuous solution polymerization is preferably performed while circulating a refrigerant through a jacket, a coil, or the like, so as to control exothermic reaction that can occur in the reactors during the polymerization process.

In some embodiments, the reaction solution with the polymerization initiator and the molecular weight regulator added thereto may be polymerized to a conversion ratio of about 30% to about 40%, for example, about 32% to about 38%, in the first reactor. Within this range, stable polymerization can be achieved without excessive load of a stirrer.

In some embodiments, a reaction temperature in the first reactor may range from about 60° C. to about 150° C., for example, about 70° C. to about 130° C. Here, the reaction temperature may be varied depending on the type of reactor, stirring rate, the type of polymerization initiator used, and the like.

In some embodiments, a stirring rate in the first reactor may range from about 140 rpm to about 160 rpm. Here, the stirring rate may be varied depending on reactor size, the type of polymerization initiator used, reaction temperature, and the like. Within this range, the large-diameter rubber polymer can be prepared.

In some embodiments, the polymerized product prepared in the first reactor may be polymerized to a conversion ratio of about 70% to about 80% in the second reactor. Within this range, the large-diameter rubber polymer can be prepared.

In some embodiments, a reaction temperature in the second reactor may range from about 80° C. to about 170° C., for example, about 120° C. to about 160° C. Here, the reaction temperature may be varied depending on the type of reactor, stirring rate, the type of polymerization initiator used, and the like.

In some embodiments, a stirring rate in the second reactor may range from about 75 rpm to about 85 rpm. Here, the stirring rate may be varied depending on reactor size, the type of polymerization initiator used, reaction temperature, and the like. Within this range, the large-diameter rubber polymer can be prepared.

In some embodiments, the continuous solution polymerization may further include removing unreacted monomers and a solvent residue by devolatilizing a polymerized product prepared in the second reactor. Here, the devolatilization process may be performed using a devolatilization tank. In one embodiment, the devolatilization process may be performed using a single devolatilization tank. In another embodiment, the devolatilization process may be performed using a first devolatilization tank and a second devolatilization tank vertically connected to each other to remove remaining unreacted material. Through the devolatilization process, the content of residual monomers in the polymerized product may be reduced to about 1,500 ppm or less, for example, about 1,000 ppm or less, specifically about 700 ppm or less.

In some embodiments, the devolatilization tank (devolatilization device) is preferably a fall-stranding devolatilization tank (DEVO). Here, the angle of a cone of the fall-stranding devolatilization tank is set to minimize retention time in the devolatilization tank and to effectively transfer a devolatilized product to an underlying gear pump.

In some embodiments, the first devolatilization tank and the second devolatilization tank may be vertically connected to each other to minimize a connection line between the DEVOs. In addition, it is desirable that the first devolatilization tank DV-1 be provided with a control valve or a regulator to regulate pressure thereof.

In some embodiments, the first devolatilization tank may be operated under conditions of a pressure of about 100 torr to about 600 torr, for example, about 200 torr to about 500 torr, a temperature of about 160° C. to about 240° C., for example, about 180° C. to about 220° C., and a retention time of about 10 minutes or less. Within these ranges, reduction in impurities such as remaining monomers and high productivity can be achieved. In addition, the second devolatilization tank may be operated under conditions of a pressure of about 1 torr to about 50 torr, a temperature of about 210° C. to about 250° C., and a retention time of about 10 minutes or less, for example, 5 minutes or less. Within these ranges, the prepared rubber-modified aromatic vinyl copolymer resin can have good properties in terms of color and the like.

In some embodiments, the aromatic vinyl copolymer resin (D) in the rubber-modified aromatic vinyl copolymer resin may be a polymer of the monomer mixture including the aromatic vinyl monomer and the monomer copolymerizable with the aromatic vinyl monomer, such as a vinyl cyanide monomer, and may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength and moldability.

In some embodiments, the large-diameter rubber polymer (C) may be present in an amount of about 0.5 parts by weight to about 5 parts by weight, for example, about 1 part by weight to about 3 parts by weight, relative to about 100 parts by weight of the polycarbonate resin. Within this range, the thermoplastic resin composition can have good external appearance, flowability (moldability), and the like.

In some embodiments, the aromatic vinyl copolymer resin (D) may be present in an amount of about 3 parts by weight to about 20 parts by weight, for example, about 7 parts by weight to about 15 parts by weight, relative to about 100 parts by weight of the polycarbonate resin. Within this range, the thermoplastic resin composition can have good external appearance, flowability (moldability), and the like.

(E) Phosphorus Flame Retardant

The phosphorus flame retardant according to one embodiment of the invention may include any typical phosphorus flame retardant used in typical thermoplastic resin compositions. For example, the phosphorus flame retardant may include a phosphate compound, a phosphonate compound, a phosphinate compound, a phosphine oxide compound, a phosphazene compound, and a metal salt thereof. These compounds may be used alone or as a mixture thereto.

In some embodiments, the phosphorus flame retardant may include an aromatic phosphoric ester compound (phosphate compound) represented by Formula 1.

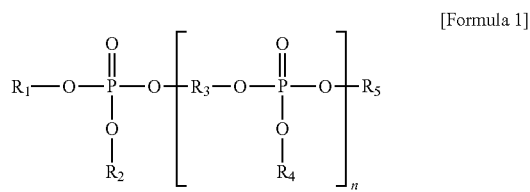

[Formula 1]

where $R_1$, $R_2$, $R_4$ and $R_5$ are each independently a hydrogen atom, a $C_6$ to $C_{20}$ aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer of 0 to 10, for example, 0 to 4.

When n is 0 in Formula 1, examples of the aromatic phosphoric ester compound may include diaryl phosphates, such as diphenyl phosphate, triphenyl phosphate, tricresyl phosphate, trixylenyl phosphate, tri(2,6-dimethylphenyl) phosphate, tri(2,4,6-trimethylphenyl)phosphate, tri(2,4-di-tert-butylphenyl) phosphate, and tri(2,6-dimethylphenyl) phosphate; and when n is 1 in Formula 1, examples of the aromatic phosphoric ester compound may include bisphenol-A diphosphate, bisphenol-A bis(diphenyl phosphate), resorcinol bis(diphenyl phosphate), resorcinol bis[bis(2,6-dimethylphenyl)phosphate], resorcinol bis[bis(2,4-di-tert-butylphenyl)phosphate], hydroquinone bis[bis(2,6-dimethylphenyl)phosphate], hydroquinone bis(diphenyl phosphate), and hydroquinone bis[bis(2,4-di-tert-butylphenyl)phosphate], without being limited thereto. In addition, when n is 2 or more in Formula 1, the aromatic phosphoric ester compound may be an oligomer type bisphenol-A diphosphate. These compounds may be used alone or as a mixture thereof.

In some embodiments, the phosphorus flame retardant may be present in an amount of about 10 parts by weight to about 30 parts by weight, for example, about 15 parts by weight to about 25 parts by weight, relative to about 100 parts by weight of the polycarbonate resin. Within this range, the thermoplastic resin composition can have good flame retardancy, thermal stability, flowability, and the like.

(F) Talc

According to one embodiment, talc serves to improve flowability, stiffness, (thin film) flame retardancy, and external appearance of the thermoplastic resin composition while maintaining balance therebetween in cooperation with wollastonite.

In some embodiments, the talc may be typical flake talc. The talc may have an average particle diameter of about 2 μm to about 10 μm, for example, about 3 μm to about 7 μm. Within this range, the thermoplastic resin composition can exhibit good stiffness, dimensional stability, external appearance, and the like.

In some embodiments, the talc may have a bulk density of about 0.3 g/cm³ to about 1.0 g/cm³, for example, about 0.4 g/cm³ to about 0.8 g/cm³. Within this range, the thermoplastic resin composition can exhibit good stiffness, dimensional stability, external appearance, and the like.

In some embodiments, the talc may be present in an amount of about 3 to about 25 parts by weight, for example, about 8 to about 20 parts by weight, relative to about 100 parts by weight of the polycarbonate resin. Within this range, the thermoplastic resin composition can exhibit good flowability, dimensional stability, stiffness, flame retardancy, and the like.

(G) Wollastonite

According to one embodiment, wollastonite serves to improve flowability, stiffness, (thin film) flame retardancy, and external appearance of the thermoplastic resin composition while maintaining balance therebetween in cooperation with talc.

In some embodiments, the wollastonite refers to a white acicular calcium-based mineral and at least part of the surface thereof may be subjected to hydrophobic surface treatment. Here, hydrophobic surface treatment may be performed by, for example, coating the surface of the wollastonite with an olefin, epoxy or silane-based substance, without being limited thereto.

In some embodiments, the wollastonite may have an average transverse length (diameter) of about 5 μm to about 10 μm, for example, about 6 μm to about 9 μm, and an aspect ratio (width:length) of about 1:7 to about 1:9. Within this range, the thermoplastic resin composition can exhibit good stiffness, dimensional stability, impact resistance, and the like.

In some embodiments, the wollastonite may have a bulk density of about 0.3 g/cm$^3$ to about 0.6 g/cm$^3$, for example, about 0.4 g/cm$^3$ to about 0.5 g/cm$^3$. Within this range, the thermoplastic resin composition can exhibit good stiffness, dimensional stability, and the like.

In some embodiments, the wollastonite may be present in an amount of about 5 parts by weight to about 20 parts by weight, for example, about 7 parts by weight to about 15 parts by weight, relative to about 100 parts by weight of the polycarbonate resin. Within this range, the thermoplastic resin composition can exhibit good flowability, dimensional stability, stiffness, flame retardancy, and the like.

In some embodiments, the talc (F) and the wollastonite (G) may be present in a weight ratio ((F):(G)) of about 1:0.1 to about 1:5, for example, about 1:0.3 to about 1:2. Within this range, the thermoplastic resin composition can exhibit good dimensional stability, stiffness, and the like.

(H) Maleic Anhydride-Grafted Rubber Polymer

The maleic anhydride-grafted rubber polymer according to one embodiment of the invention serves to improve flowability, impact resistance, thermal stability, dimensional stability, and external appearance of the thermoplastic resin composition by improving compatibility and dispersion of the components of the thermoplastic resin composition, and may be prepared by graft polymerization of maleic anhydride (MAH) to a rubber polymer (a copolymer of olefin and/or an aromatic vinyl monomer).

In some embodiments, the maleic anhydride-grafted rubber polymer may include at least one of maleic anhydride-grafted ethylene-octene rubber (MAH-g-EOR), maleic anhydride-grafted ethylene-butene rubber (MAH-g-EBR), maleic anhydride-grafted ethylene-propylene-diene monomer terpolymer (MAH-g-EPDM), maleic anhydride-grafted styrene-ethylene-butadiene-styrene copolymer (MAH-g-SEBS), maleic anhydride-grafted polypropylene (MAH-g-PP), and maleic anhydride-grafted polyethylene (MAH-g-PE).

In some embodiments, the maleic anhydride-grafted rubber polymer may be obtained through graft polymerization of maleic anhydride to a rubber polymer, which is a copolymer of a monomer mixture including an olefin, such as ethylene, σ-olefin, and the like, and an aromatic vinyl monomer, such as styrene and the like. For example, the maleic anhydride-grafted rubber polymer may be prepared by a reactive extrusion process in which a peroxide is added to a rubber polymer having a melt-flow index (MI) of about 10 to about 50 g/10 min, such as a styrene-ethylene-butadiene-styrene (SEBS) copolymer, in a twin-screw extruder in order to introduce maleic anhydride to the ethylene bond through generation of free radicals by splitting the ethylene bond.

In some embodiments, the maleic anhydride may be present in an amount of about 0.1 wt % to about 3 wt % and the rubber polymer may be present in an amount of about 95 wt % to about 99.9 wt % based on 100 wt % of the maleic anhydride-grafted rubber polymer, without being limited thereto.

In some embodiments, the maleic anhydride-grafted rubber polymer may be present in an amount of about 0.01 parts by weight to about 5 parts by weight, for example, about 0.1 parts by weight to about 3 parts by weight, relative to about 100 parts by weight of the polycarbonate resin. Within this range, the thermoplastic resin composition can have good flowability, thermal stability, external appearance, and the like.

(I) Black Pigment

According to one embodiment, the black pigment serves to improve external appearance and stiffness of the thermoplastic resin composition and may include, for example, carbon black and the like.

In some embodiments, the black pigment may have an average particle diameter (D50, volume average) of about 10 nm to about 24 nm, for example, about 15 nm to about 22 nm, as measured by a particle size analyzer. Within this range, the thermoplastic resin composition can exhibit good external properties, such as color and the like.

In some embodiments, the black pigment may be present in an amount of about 0.05 parts by weight to about 3 parts by weight, for example, about 0.3 parts by weight to about 2 parts by weight, relative to about 100 parts by weight of the polycarbonate resin. Within this range, the thermoplastic resin composition can have good external appearance, stiffness, flame retardancy, and the like.

The thermoplastic resin composition according to one embodiment of the invention may further include additives, such as a release agent, a lubricant, a nucleating agent, a plasticizer, a heat stabilizer, a photostabilizer, a flame retardant aid, an anti-dripping agent, an antioxidant, and a mixture thereof.

In some embodiments, the additives may include any suitable additives used in typical thermoplastic resin compositions, without limitation. For example, the additives may include: a release agent, such as polyethylene wax, a fluorine-containing polymer, silicone oil, a metal salt of stearic acid, a metal salt of montanic acid, and montanic ester wax; a nucleating agent, such as clay and the like; an antioxidant, such as a hindered phenol compound and the like; and a mixture thereof, without being limited thereto. The additive may be present in an amount of about 0.1 parts by weight to about 40 parts by weight relative to about 100 parts by weight of the polycarbonate resin, without being limited thereto.

The thermoplastic resin composition according to one embodiment of the invention may be prepared in pellet form by mixing the aforementioned components, followed by melt extrusion in a typical twin-screw type extruder at about 200° C. to about 280° C., for example, about 250° C. to about 260° C.

In some embodiments, the thermoplastic resin composition may have a bonding strength (shear strength) of about 140 kgf/cm$^2$ to 300 about kgf/cm$^2$, for example, about 150 kgf/cm$^2$ to about 250 kgf/cm$^2$, as measured in accordance with ASTM D1002 on an injection molded specimen having a size of 100 mm×25 mm×2 mm and bonded to a metal specimen having the same size as the injection molded specimen to overlap each other in an area of 25 mm×25 mm via a bonding agent, after heating a bonded portion between the specimens at 80° C. for 120 seconds and aging at room temperature for 5 minutes.

In some embodiments, the thermoplastic resin composition may have a flame retardancy of V-1 or higher, as measured on a 1.0 mm thick specimen by a UL-94 vertical test method.

In some embodiments, the thermoplastic resin composition may have a melt-flow index (MI) of about 30 g/10 min to about 60 g/10 min, for example, about 45 g/10 min to about 55 g/10 min, as measured under conditions of 220° C. and 5 kgf in accordance with ASTM D1238.

A molded article according to the present invention is formed of the thermoplastic resin composition.

In some embodiments, the molded article may be a plastic member of a housing of an electronic product, which includes a metal frame and a plastic member adjoining at least one surface of the metal frame.

FIG. 1 is a schematic sectional view of a housing of an electronic product according to one embodiment of the present invention. It should be understood that the drawings are not to precise scale and the dimensions of components are exaggerated for clarity of description in the drawings. Referring to FIG. 1, the housing of an electronic product according to one embodiment includes a metal frame 10 and at least one plastic member 20 adjoining at least one surface of the metal frame 10, wherein the plastic member is formed of the thermoplastic resin composition according to the embodiments of the invention.

In some embodiments, the metal frame 10 and the plastic member 20 may have various shapes without being limited to the shapes shown in the drawings. The metal frame 10 and the plastic member 20 form an adjoining structure in which the metal frame 10 adjoins at least one surface of the plastic member 20. The adjoining structure may be realized by bonding or insertion, but is not limited thereto.

In some embodiments, the metal frame 10 may be a stainless steel frame or may be of any commercially available products, which can be applied to a typical housing of electronic products.

In some embodiments, the plastic member 20 may be formed of the polycarbonate resin composition by various molding methods, such as injection molding, extrusion molding, vacuum molding, casting, and the like. Specifically, the plastic member 20 may be formed by heat molding, steam molding (RHCM (rapid heat cycle molding)) or the like, and may be a front cover or a rear cover of a 22" to 75" thin film type TV, a thin film monitor, and the like. The plastic member 20 is applicable to external appearance specifications, such as a hairline pattern, a corrosion pattern, and the like.

MODE FOR INVENTION

Next, the present invention will be described in more detail with reference to some examples. It should be understood that these examples are provided for illustration only and are not to be in any way construed as limiting the invention.

EXAMPLE

Details of components used in Examples and Comparative Examples are as follows.

(A) Polycarbonate Resin

A bisphenol-A polycarbonate resin (melt-flow index (MI) measured under conditions of 300° C. and 1.2 kg in accordance with ISO 1133): 90±10 g/10 min) was used.

(B) Rubber-Modified Vinyl Graft Copolymer

A g-ABS copolymer obtained through graft-copolymerization of 55 wt % of styrene and acrylonitrile (weight ratio: 75/25) to 45 wt % of butyl acrylate rubber (average particle size: 310 nm) was used.

(C) Large-Diameter Rubber Polymer and (D) Aromatic Vinyl Copolymer Resin (C1) Large-diameter rubber polymer and (D1) aromatic vinyl copolymer resin: 8.8 parts by weight of butadiene rubber (BR-1, ASADENE 55AE) having a viscosity of 170 cP in a 5 wt % styrene solution was dissolved in a mixed solution consisting of 53.4 parts by weight of a styrene monomer, 17.8 parts by weight of an acrylonitrile monomer, and 20 parts by weight of ethyl benzene as a reaction solvent, followed by adding 0.015 parts by weight of 1,1-bis(t-butylperoxy)cyclohexane as a polymerization initiator and 0.07 parts by weight of t-dodecyl mercaptan as a molecular weight regulator, thereby preparing a mixed solution. The prepared mixed solution was introduced into reactors at a rate of 25 kg/hr. In a first reactor, the prepared mixed solution was subjected to stirring at a rate of 150 rpm and polymerization to a conversion ratio of 35%. In a second reactor, the resulting product prepared in the first reactor was subjected to stirring at a rate of 80 rpm and polymerization to a conversion ratio of 75%, followed by removal of remaining unreacted material through a devolatilization tank, thereby preparing a rubber-modified aromatic vinyl copolymer resin (ABS resin, a mixture of a large-diameter rubber polymer (C1, dispersed phase) and an aromatic vinyl copolymer resin (SAN resin, D1, continuous phase), dispersed phase:continuous phase: 12 wt %:88 wt %) in pellet form. Here, the large-diameter rubber polymer (C1) had an average particle diameter of 591 nm and the SAN resin (D1) had a weight average molecular weight of 130,000 g/mol.

(C2) Rubber polymer and (D2) aromatic vinyl copolymer resin: A rubber-modified aromatic vinyl copolymer resin (ABS resin, a mixture of a rubber polymer (C2, dispersed phase) and an aromatic vinyl copolymer resin (SAN resin, D2, continuous phase), dispersed phase:continuous phase: 12 wt %:88 wt %) was prepared in the same manner as in preparation of (C1) and (D1), except that the stirring rate in the first reactor was changed to 170 rpm and the stirring rate in the second reactor was changed to 90 rpm. Here, the rubber polymer (C2) had an average particle diameter of 305 nm and the SAN resin (D2) had a weight average molecular weight of 130,000 g/mol.

(C3) Rubber polymer and (D3) aromatic vinyl copolymer resin: A rubber-modified aromatic vinyl copolymer resin (ABS resin, a mixture of a rubber polymer (C3, dispersed phase) and an aromatic vinyl copolymer resin (SAN resin, D3, continuous phase), dispersed phase:continuous phase: 12 wt %:88 wt %) was prepared in the same manner as in preparation of (C1) and (D1), except that the stirring rate in the first reactor was changed to 130 rpm and the stirring rate in the second reactor was changed to 70 rpm. Here, the rubber polymer (C3) (C2) had an average particle diameter of 5,160 nm and the SAN resin (D3) had a weight average molecular weight of 130,000 g/mol.

(E) Phosphorus Flame Retardant

Oligomer type bisphenol-A diphosphate (Manufacturer: Yoke Chemical Co., Ltd., Product Name: YOKE BDP) was used.

(F) Talc

Talc (Manufacturer: KOCH Co., Ltd., Product Name: KCM 6300, volume density: 0.4 to 0.6 g/cm3) was used.

(G) Wollastonite

Wollastonite (Manufacturer: NYCO Co., Ltd., Product Name: 4W, volume density: 0.4 to 0.5 g/cm$^3$) was used.

(H) Maleic Anhydride-Grafted Rubber Polymer

MAH-g-EBR (Manufacturer: Mitsui Co., Ltd., Product Name: TAFMER) was used.

(I) Black Pigment

Carbon black (Manufacturer: Orion Co., Ltd., Product Name: High Black, average particle diameter: 18 nm) was used.

Examples 1 to 4 and Comparative Examples 1 to 5

The aforementioned components were mixed in amounts as listed in Table 1, followed by extrusion at 250° C., thereby preparing a thermoplastic resin composition in pellet form. Here, extrusion was performed using a twin-screw extruder (L/D: 36, Φ: 45 mm). The prepared pellets were dried at 80° C. for 4 hours or more and then subjected to injection molding using a 6 oz. injection machine (molding temperature: 250° C. to 260° C., mold temperature: 60° C.), thereby preparing a specimen. The prepared specimen was evaluated as to the following properties. Results are shown in Table 1.

Property Evaluation (1) Bonding strength (shear stress, unit: kgf/cm$^2$): Bonding strength was measured in accordance with ASTM D1002 on an injection molded specimen having a size of 100 mm×25 mm×2 mm and bonded to a metal (aluminum) specimen having the same size as the injection molded specimen to overlap each other in an area of 25 mm×25 mm via a bonding agent (Manufacturer: Henkel, Product Name: LOCTITE HF8150R), after heating a bonded portion between the specimens at 80° C. for 120 seconds using a heat gun and aging at room temperature for 5 minutes.

(2) Flame retardancy: Flame retardancy was measured using 1.0 mm thick specimen in accordance with the UL 94 vertical test standard.

(3) Melt-flow index (MI, unit: g/10 min): Melt-flow index was measured under conditions of 220° C. and 10 kgf in accordance with ASTMD1238.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| (A) (parts by weight) | 100 | 100 | 100 | 100 | 100 | 100 | 100 | 100 | 100 |
| (B) (parts by weight) | 5 | 5 | 5 | 5 | 15 | 5 | 5 | 5 | 5 |
| (C1) (parts by weight) | 1.2 | 1.8 | 2.4 | 1.8 | — | 1.8 | 1.8 | — | — |
| (C2) (parts by weight) | — | — | — | — | — | — | — | 1.8 | — |
| (C3) (parts by weight) | — | — | — | — | — | — | — | — | 1.8 |
| (D1) (parts by weight) | 8.8 | 13.2 | 17.6 | 13.2 | — | 13.2 | 13.2 | — | — |
| (D2) (parts by weight) | — | — | — | — | — | — | — | 13.2 | — |
| (D3) (parts by weight) | — | — | — | — | — | — | — | — | 13.2 |
| (E) (parts by weight) | 20 | 20 | 20 | 20 | 20 | 20 | 20 | 20 | 20 |
| (F) (parts by weight) | 10 | 10 | 10 | 15 | 10 | — | 15 | 10 | 10 |
| (G) (parts by weight) | 5 | 5 | 5 | 5 | 5 | 15 | — | 5 | 5 |
| (H) (parts by weight) | 0.8 | 0.8 | 0.8 | 0.8 | 0.8 | 0.8 | 0.8 | 0.8 | 0.8 |
| (I) (parts by weight) | 1 | 1 | 1 | 1 | 1 | 1 | 1 | 1 | 1 |
| Bonding strength | 150 | 190 | 210 | 160 | 90 | 130 | 110 | 120 | 200 |
| Flame retardancy | V-0 | V-0 | V-1 | V-1 | V-0 | V-1 | V-1 | V-1 | V-2 |
| Melt-flow Index | 45 | 50 | 55 | 45 | 35 | 45 | 35 | 40 | 35 |

From the results shown in Table 1, it could be seen that the thermoplastic resin composition according to the present invention had good properties in terms of adhesion to metal, flame retardancy, flowability (melt-flow index), stiffness, dimensional stability, external appearance, and the like.

Conversely, it could be seen that the thermoplastic resin composition of Comparative Example 1 prepared without using the large-diameter rubber polymer and the aromatic vinyl copolymer resin suffered from decrease in bonding strength and relative deterioration in flowability; the thermoplastic resin composition of Comparative Example 2 prepared without using talc suffered from decrease in bonding strength; and the thermoplastic resin composition of Comparative Example 2 prepared without using wollastonite suffered from decrease in bonding strength and the like. It could be seen that the thermoplastic resin composition of Comparative Example 4 prepared using the rubber polymer (C2) and the aromatic vinyl copolymer resin (D2) instead of the large-diameter rubber polymer (C1) and the aromatic vinyl copolymer resin (D1) suffered from decrease in bonding strength and the like; and the thermoplastic resin composition of Comparative Example 4 prepared using the rubber polymer (C3) and the aromatic vinyl copolymer resin (D3) instead of the large-diameter rubber polymer (C1) and the aromatic vinyl copolymer resin (D1) suffered from decrease in flame retardancy.

It should be understood that various modifications, changes, alterations, and equivalent embodiments can be made by those skilled in the art without departing from the spirit and scope of the present invention.

The invention claimed is:

1. A thermoplastic resin composition comprising:
about 100 parts by weight of a polycarbonate resin;
about 1 part by weight to about 10 parts by weight of a rubber-modified vinyl graft copolymer;
about 0.5 parts by weight to about 5 parts by weight of a large-diameter rubber polymer having an average particle diameter of about 400 nm to about 1,500 nm;
about 3 parts by weight to about 20 parts by weight of an aromatic vinyl copolymer resin;
about 10 parts by weight to 30 parts by weight of a phosphorus flame retardant;
about 3 parts by weight to about 25 parts by weight of talc;
about 5 parts by weight to about 20 parts by weight of wollastonite;
about 0.01 parts by weight to about 5 parts by weight of a maleic anhydride-grafted rubber polymer; and
about 0.05 parts by weight to about 3 parts by weight of a black pigment,
wherein the large-diameter rubber polymer and the aromatic vinyl copolymer resin are present in the form of a rubber-modified aromatic vinyl copolymer resin comprising a mixture of the large-diameter rubber polymer having an average particle diameter of about 400 nm to about 1,500 nm as a dispersed phase and the aromatic vinyl copolymer resin as a continuous phase, prepared through continuous solution polymerization of a rubber polymer having a viscosity of about 150 cP or more in a 5 wt % styrene solution, an aromatic vinyl monomer, and a monomer copolymerizable with the aromatic vinyl monomer.

2. The thermoplastic resin composition according to claim 1, wherein the rubber-modified vinyl graft copolymer is obtained through graft copolymerization of a monomer mixture comprising an aromatic vinyl monomer and a vinyl cyanide monomer to a rubber polymer having an average particle diameter of about 100 nm to about 600 nm.

3. The thermoplastic resin composition according to claim 1, wherein the aromatic vinyl copolymer resin is a polymer of an aromatic vinyl monomer and a monomer copolymerizable with the aromatic vinyl monomer.

4. The thermoplastic resin composition according to claim 1, wherein the phosphorus flame retardant is selected from a phosphate compound, a phosphonate compound, a phosphinate compound, a phosphine oxide compound, and/or a phosphazene compound.

5. The thermoplastic resin composition according to claim 1, wherein the talc and the wollastonite are present in a weight ratio of about 1:0.3 to about 1:2.

6. The thermoplastic resin composition according to claim 1, wherein the maleic anhydride-grafted rubber polymer is selected from maleic anhydride-grafted ethylene-octene rubber (MAH-g-EOR), maleic anhydride-grafted ethylene-butene rubber (MAH-g-EBR), maleic anhydride-grafted ethylene-propylene-diene monomer terpolymer (MAH-g-EPDM), maleic anhydride-grafted styrene-ethylene-butadiene-styrene copolymer (MAH-g-SEBS), maleic anhydride-grafted polypropylene (MAH-g-PP), and/or maleic anhydride-grafted polyethylene (MAH-g-PE).

7. The thermoplastic resin composition according to claim 1, wherein the black pigment has an average particle diameter of about 10 nm to about 24 nm.

8. The thermoplastic resin composition according to claim 1, wherein the thermoplastic resin composition has a bonding strength (shear strength) of about 140 kgf/cm$^2$ to 300 about kgf/cm$^2$, as measured in accordance with ASTM D1002 on an injection molded specimen having a size of 100 mm×25 mm×2 mm and bonded to a metal specimen having the same size as the injection molded specimen to overlap each other in an area of 25 mm×25 mm via a bonding agent, after heating a bonded portion between the specimens at 80° C. for 120 seconds and aging at room temperature for 5 minutes.

9. The thermoplastic resin composition according to claim 1, wherein the thermoplastic resin composition has a flame retardancy of V-1 or higher, as measured on a 1.0 mm thick specimen by a UL-94 vertical test method.

10. The thermoplastic resin composition according to claim 1, wherein the thermoplastic resin composition has a melt-flow index (MI) of about 30 g/10 min to about 60 g/10 min, as measured under conditions of 220° C. and 5 kgf in accordance with ASTM D1238.

11. A molded article formed of the thermoplastic resin composition according to claim 1.

12. The molded article according to claim 11, wherein the molded article is a plastic member of an electronic device housing comprising a metal frame and a plastic member adjoining at least one surface of the metal frame.

13. The thermoplastic resin composition according to claim 1, wherein the thermoplastic resin composition has a bonding strength (shear strength) of about 140 kgf/cm$^2$ to 300 about kgf/cm$^2$, as measured in accordance with ASTM D1002 on an injection molded specimen having a size of 100 mm×25 mm×2 mm and bonded to a metal specimen having the same size as the injection molded specimen to overlap each other in an area of 25 mm×25 mm via a bonding agent, after heating a bonded portion between the specimens at 80° C. for 120 seconds and aging at room temperature for 5 minutes; a flame retardancy of V-1 or higher, as measured on a 1.0 mm thick specimen by a UL-94 vertical test method; and a melt-flow index (MI) of about 30 g/10 min to about 60 g/10 min, as measured under conditions of 220° C. and 5 kgf in accordance with ASTM D1238.

14. The thermoplastic resin composition according to claim 13, wherein the thermoplastic resin composition has a melt-flow index (MI) of about 45 g/10 min to about 60 g/10 min, as measured under conditions of 220° C. and 5 kgf in accordance with ASTM D1238.

15. The thermoplastic resin composition according to claim 1, wherein the maleic anhydride-grafted rubber polymer is selected from maleic anhydride-grafted ethylene-octene rubber (MAH-g-EOR), maleic anhydride-grafted ethylene-butene rubber (MAH-g-EBR), maleic anhydride-grafted ethylene-propylene-diene monomer terpolymer (MAH-g-EPDM), and/or maleic anhydride-grafted styrene-ethylene-butadiene-styrene copolymer (MAH-g-SEBS).

* * * * *